US009259085B2

(12) United States Patent
Reinbigler et al.

(10) Patent No.: US 9,259,085 B2
(45) Date of Patent: Feb. 16, 2016

(54) DEVICE FOR SUPPORTING A PLURALITY OF FLEXIBLE CONTAINERS FOR LIQUID

(71) Applicant: EMD Millipore Corporation, Billerica, MA (US)

(72) Inventors: Rene Reinbigler, Kircheim (FR); Jean-Louis Weissenbach, Ville (FR)

(73) Assignee: EMD Millipore Corporation, Billerica, MA (US)

( * ) Notice: Subject to any disclaimer, the term of this patent is extended or adjusted under 35 U.S.C. 154(b) by 0 days.

(21) Appl. No.: 14/265,429

(22) Filed: Apr. 30, 2014

(65) Prior Publication Data

US 2014/0231371 A1 Aug. 21, 2014

Related U.S. Application Data

(63) Continuation of application No. 12/692,739, filed on Jan. 25, 2010, now Pat. No. 8,746,470.

(30) Foreign Application Priority Data

Feb. 4, 2009 (FR) ..................................... 09 50694

(51) Int. Cl.
*A47B 57/04* (2006.01)
*A47B 81/00* (2006.01)
(Continued)

(52) U.S. Cl.
CPC ................. *A47B 81/00* (2013.01); *A47B 57/04* (2013.01); *A47B 91/002* (2013.01); *A47F 5/0037* (2013.01); *B62B 3/006* (2013.01); *A61G 12/001* (2013.01)

(58) Field of Classification Search
CPC ...... A47B 57/04; A47B 81/00; A47B 5/0037; A61G 12/001; B62B 3/006

USPC ......... 211/1.51, 49.1, 59.2, 71.01, 79, 80, 81, 211/85.31, 85.8, 85.17, 126.15, 126.9, 211/126.11, 126.12, 126.14, 133.5, 126.2, 211/133.1, 150, 134, 162, 168, 169, 169.1, 211/170, 173, 174, 195, 189, 57.1; 312/249.8, 249.11; 108/1, 6, 109; 222/181.1, 165, 166, 164; 248/133, 248/134, 135, 136, 137, 139, 140, 141, 142

See application file for complete search history.

(56) References Cited

U.S. PATENT DOCUMENTS 462,082 A * 10/1891 High .............................. 211/150
638,443 A * 12/1899 Canedy ......................... 108/177
(Continued)

FOREIGN PATENT DOCUMENTS

EP 0658327 A1 6/1995
NL 1004755 C2 6/1998

OTHER PUBLICATIONS

French Search Report dated Nov. 23, 2009 in corresponding French patent application No. FR 0950694.

*Primary Examiner* — Stanton L Krycinski
(74) *Attorney, Agent, or Firm* — Nields, Lemack & Frame, LLC

(57) ABSTRACT

A device for supporting a plurality of flexible containers for liquid, including a plurality of baskets, each containing at least one of the flexible containers, a magazine to receive the baskets, able to adopt an operating configuration in which the baskets are disposed inclined one above the other, which magazine includes supports for the baskets, able to adopt a loading/unloading position such that each basket can be loaded/unloaded along a horizontal path, and able to adopt an operating position to maintain each basket in an inclined position to make the magazine adopt the operating configuration, and a driver for driving the supports between the loading/unloading position and the operating position.

14 Claims, 9 Drawing Sheets

(51) Int. Cl.
 *A47F 5/00* (2006.01)
 *B62B 3/00* (2006.01)
 *A47B 91/00* (2006.01)
 *A61G 12/00* (2006.01)

(56) References Cited

U.S. PATENT DOCUMENTS

| | | | | |
|---|---|---|---|---|
| 947,640 | A * | 1/1910 | Jefferson | 248/142 |
| 1,094,669 | A * | 4/1914 | McCord | 248/142 |
| 1,138,340 | A * | 5/1915 | Wiles | 248/134 |
| 1,139,007 | A * | 5/1915 | Wright | 211/81 |
| 1,323,775 | A * | 12/1919 | Kroff | 248/134 |
| 1,745,784 | A * | 2/1930 | Davis | 211/182 |
| 1,937,443 | A * | 11/1933 | Shears | 248/134 |
| 2,084,711 | A * | 6/1937 | Smith | 141/317 |
| 3,111,915 | A * | 11/1963 | Gray | 108/6 |
| 3,120,199 | A * | 2/1964 | Kolster et al. | 108/6 |
| 3,232,442 | A * | 2/1966 | Wilson | 211/133.2 |
| 3,499,539 | A * | 3/1970 | Fisher | 211/59.2 |
| 3,981,511 | A * | 9/1976 | Foster | 280/79.3 |
| 4,067,265 | A * | 1/1978 | Watson | 108/7 |
| 4,191,296 | A * | 3/1980 | Morgan | 211/59.2 |
| 4,405,052 | A * | 9/1983 | Spiros | 211/187 |
| 4,531,646 | A * | 7/1985 | Howard | 211/150 |
| 4,627,542 | A * | 12/1986 | Fredrickson | 211/150 |
| 4,651,883 | A * | 3/1987 | Gullett et al. | 211/59.2 |
| 4,688,681 | A * | 8/1987 | Bergeron | 211/36 |
| 4,712,691 | A * | 12/1987 | Grill et al. | 211/49.1 |
| 4,795,041 | A * | 1/1989 | Remmers | 211/126.15 |
| 5,048,699 | A * | 9/1991 | Trevaskis | 211/59.2 |
| 5,094,350 | A * | 3/1992 | Smock | 211/59.2 |
| 5,197,613 | A * | 3/1993 | Kotlowski | 211/133.1 |
| 5,240,124 | A * | 8/1993 | Buday | 211/59.2 |
| 5,344,048 | A | 9/1994 | Bonerb | |
| 5,372,265 | A * | 12/1994 | Monch | 211/187 |
| 5,407,084 | A * | 4/1995 | Remmers | 211/183 |
| 5,439,122 | A * | 8/1995 | Ramsay | 211/187 |
| 5,487,474 | A * | 1/1996 | Heimendinger | 211/59.2 |
| 5,607,068 | A * | 3/1997 | Coretti et al. | 211/59.2 |
| 5,810,179 | A * | 9/1998 | Kleiman | 211/88.01 |
| 5,902,025 | A * | 5/1999 | Yu | 312/109 |
| 5,988,410 | A * | 11/1999 | Mandle | 211/133.1 |
| 5,992,651 | A * | 11/1999 | Shaw et al. | 211/59.2 |
| 6,006,926 | A * | 12/1999 | O'Reilly et al. | 211/45 |
| 6,379,034 | B1 * | 4/2002 | Schutz | 366/185 |
| 6,554,164 | B1 * | 4/2003 | Jones | 222/105 |
| 6,729,484 | B2 * | 5/2004 | Sparkowski | 211/187 |
| 6,773,081 | B2 * | 8/2004 | Yuyama et al. | 312/321 |
| 6,789,700 | B1 * | 9/2004 | Arniotis et al. | 222/94 |
| 7,048,131 | B2 * | 5/2006 | Gay et al. | 211/187 |
| 7,080,758 | B2 * | 7/2006 | Jones | 222/105 |
| 7,963,408 | B2 * | 6/2011 | Glover | 211/126.15 |
| 8,020,714 | B2 * | 9/2011 | Miller et al. | 211/134 |
| 8,267,261 | B2 * | 9/2012 | Vanderhoek et al. | 211/150 |
| 8,365,950 | B2 * | 2/2013 | Yuyama et al. | 221/123 |
| 8,464,878 | B2 * | 6/2013 | Andersen et al. | 211/150 |
| 8,746,470 | B2 | 6/2014 | Reinbigler et al. | |
| 2004/0089625 | A1 * | 5/2004 | Tsai | 211/126.2 |
| 2006/0124807 | A1 * | 6/2006 | Nice | 248/140 |
| 2007/0181513 | A1 * | 8/2007 | Ward | 211/59.2 |
| 2007/0295681 | A1 * | 12/2007 | Colin | 211/90.03 |
| 2008/0006591 | A1 * | 1/2008 | Corrente | 211/85.26 |
| 2008/0014062 | A1 * | 1/2008 | Yuyama | B65G 65/00 414/331.01 |
| 2009/0107938 | A1 * | 4/2009 | Miller et al. | 211/133.6 |
| 2009/0266775 | A1 * | 10/2009 | Vanderhoek et al. | 211/49.1 |
| 2010/0140201 | A1 * | 6/2010 | Andersen et al. | 211/150 |
| 2011/0024375 | A1 | 2/2011 | Reinbigler et al. | |

* cited by examiner

DEVICE FOR SUPPORTING A PLURALITY OF FLEXIBLE CONTAINERS FOR LIQUID

CROSS-REFERENCE TO RELATED APPLICATIONS

This application claims priority of U.S. patent application Ser. No. 12/692,739 filed Jan. 25, 2010, which claims priority of French Patent Application No. 0950694 filed Feb. 4, 2009, the disclosures of which are incorporated herein by reference.

FIELD

The invention concerns the support of flexible containers for liquids, for example containers adapted to be connected to an installation for biological liquid treatment.

BACKGROUND

To the inlet of the circuit of such an installation, a source container containing the product to be treated may thus be connected, but also containers containing a cleaning liquid such as sodium hydroxide (NaOH), a rinsing liquid such as pure water or a buffer liquid such as a saline solution.

To the outlet, in addition to a container for collecting the treated liquid, can be connected various other containers for collecting cleaning, rinsing or buffer liquid, or for collecting residues.

Such containers, which are flexible, are already known, in particular bags formed from one or two flexible films peripherally welded and comprising at least one inlet/outlet connector.

These single-use bags are economical to produce and may attain high capacities of several tens of liters.

Once filled with liquid, such bags however have the drawback of being particularly difficult to utilize, in particular due to their high volumes and weights associated with a high level of deformability which makes difficult their manipulation and the transfer to piping of the liquid they contain.

SUMMARY

The invention aims to enable easy and convenient utilization of such containers.

To that end, it provides a device for supporting a plurality of flexible containers for liquid; characterized in that it comprises:
  a plurality of baskets, each adapted to contain at least one said flexible container;
  a magazine to receive said baskets, able to adopt an operating configuration in which said baskets are disposed inclined one above the other with each said container being in a position in which at least one connector is in the lower part thereof, said magazine comprising:
    support means for said baskets, able to adopt a loading/unloading position in which they are adapted such that each said basket can be loaded/unloaded along a horizontal path, and able to adopt an operating position in which they are adapted to maintain each said basket in inclined position to make said magazine adopt said operating configuration, and
    means for driving said support means between said loading/unloading position and said operating position.

The device according to the invention makes it possible to limit the manipulations to be performed on the flexible containers. More particularly, it suffices for the operator to position each flexible container in a basket of the device, then to load it horizontally in the magazine the support means of which assume the loading/unloading position.

Once all the containers have been loaded, all that remains for the operator to do is to actuate the drive means to induce the passage of the support means into their operating position and thus the inclination of the baskets and of the flexible containers, such that at least one connector of each container is in the lower part thereof.

As each container is inclined, any air bubbles contained inside migrate towards its upper part, such that on connecting that container to the circuit via the connector situated in the lower part thereof, the risks of transferring air into the circuit are eliminated or at least very substantially reduced.

The device according to the invention is of course appropriate for flexible containers of small capacity but it is particularly advantageous when the flexible containers are of high capacity.

The fact of providing a plurality of baskets, each adapted to contain at least one flexible container, enables the baskets to be manipulated, which is easier in particular due to their stiffness.

The fact that the loading of the baskets containing the containers is carried out horizontally, makes it possible to use a commercially available lifting machine, for example a simple lifting truck, to install (load) the baskets onto the support means or remove (unload) them.

Lastly, as the baskets are disposed one above the other in the operating configuration of the magazine, the device according to the invention procures a great reduction in the floor area occupied by the containers in the zone of the installation, which is particularly advantageous when, as is generally the case in the operations of treatment of biopharmaceutical liquids, the installation is situated in a zone with controlled atmosphere where space is limited and very costly.

According to features that are preferred as being favorable to the simplicity and convenience of use of the device according to the invention:
  said support means comprise for each said basket, a pair of opposite runners adapted to slidingly receive said basket;
  the runners of each said pair are pivotally mounted on opposite uprights of said magazine;
  the device comprises, for each said pair, abutment means to limit the pivoting of said runners;
  said abutment means comprise at least one rod adapted to travel in an oblong opening of a said upright;
  each said pair of runners comprises means for locking said basket in said magazine;
  said locking means comprise a latch mechanically linked to one of the runners of said pair, said latch being adapted to cooperate with a positioning member of a said basket;
  said drive means comprise means for mechanical linkage rigidly linking said pair of runners together and means for pivoting said pairs of runners;
  said mechanical linkage means comprise two metal bars disposed in said uprights of which the respective tops are linked by a bridging member;
  said means for pivoting comprise reduction transmission and a source of rotation;
  said source of rotation comprises a crank;
  the ratio of said reduction transmission is such that seven crank turns leads to pivoting of said support means through approximately 20°;
  said magazine comprises a horizontal chassis mounted on wheels;

said horizontal chassis is partly hollow to permit the travel of a said basket on passage from said loading/unloading position to said operating position;

each said basket comprises a frame adapted to cooperate with said support means and a grid adapted to support a said flexible container;

each said basket comprises a retaining hook adapted to cooperate with a handle of said flexible container, said retaining hook being rigidly fixed to said tubular frame;

each said basket comprises a first retaining hook adapted to cooperate with a handle of said flexible container, said first retaining hook being rigidly fixed to said tubular frame and each said basket further comprises a second retaining hook hinged to said first retaining hook and adapted to cooperate with said handle of said flexible container; and/or said grid comprises a re-entrant portion situated on the opposite side from said retaining hook to accommodate a said connector of said flexible container.

BRIEF DESCRIPTION OF THE DRAWINGS

The disclosure of the invention will now be continued with the detailed description of an embodiment, given below by way of illustrative but non-limiting example, with reference to the accompanying drawings, in which.

DETAILED DESCRIPTION

Figure 1:
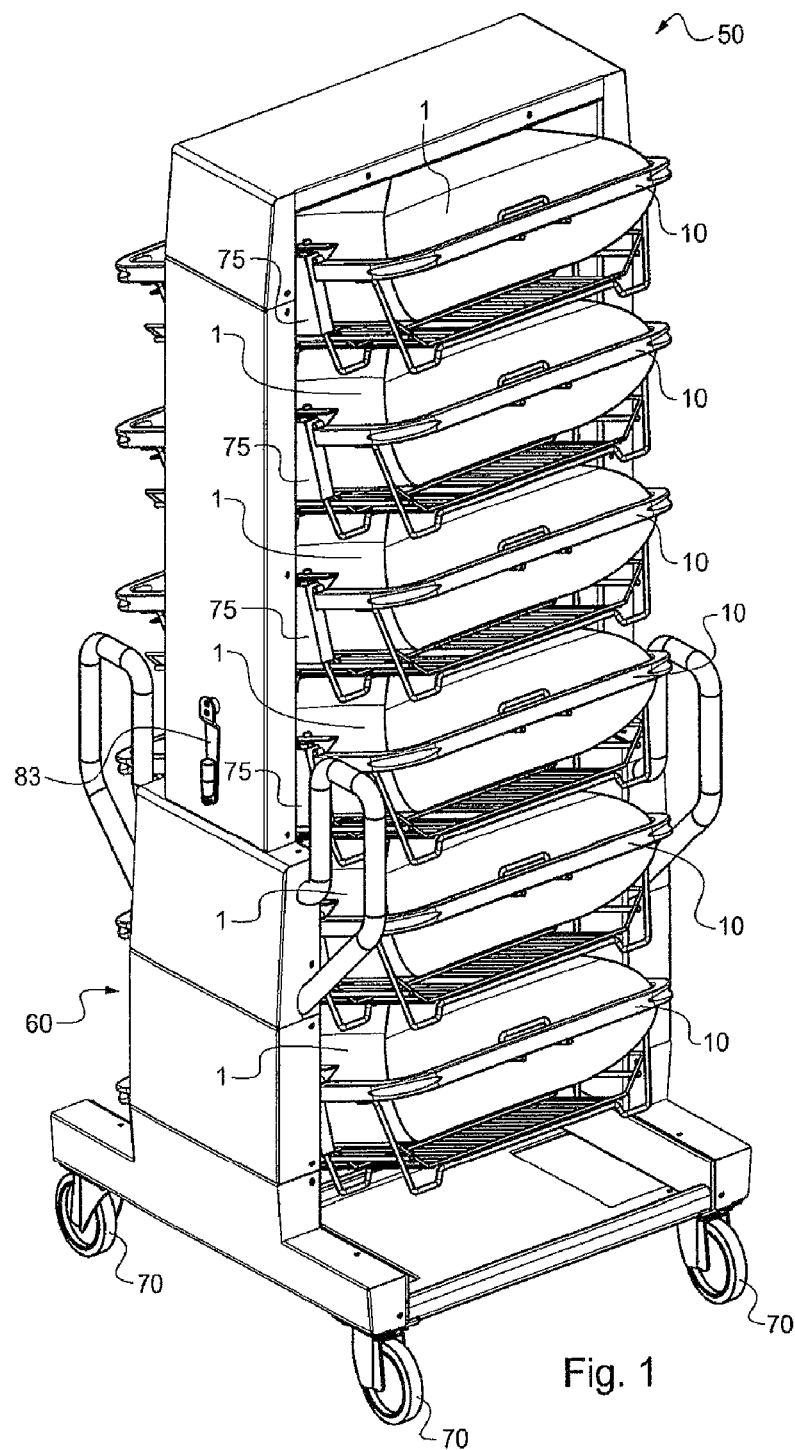
FIG. 1 is a perspective view of a device according to the invention of which the baskets each contain a flexible container filled with liquid, the magazine being in operating configuration.

The device 50 illustrated in FIG. 1 comprises a magazine 60 and a plurality of superposed baskets 10, here six baskets 10, each containing a disposable flexible bag 1 filled with biological liquid.

Figure 2:
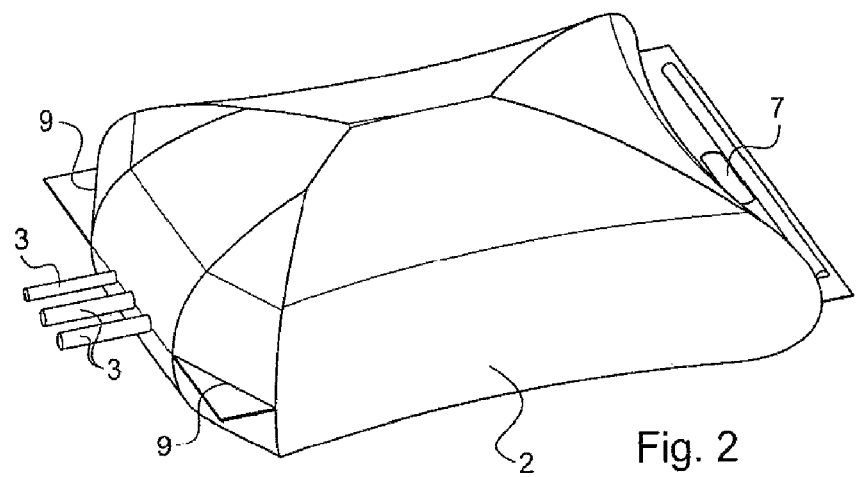
FIG. 2 is a perspective view of one of the flexible containers of FIG. 1.

Such a disposable flexible bag 1 will now be described in more detail with the aid of FIG. 2.

The bag 1, which here has a capacity of 50 liters, is here obtained from at least one PureFlex™ flexible film 2 of the applicant. This is a co-extruded film comprising four layers, respectively, from the inside to the outside, a layer of ultra low density polyethylene (ULDPE) forming the material for contact with the liquid, a copolymer of ethylene and vinyl alcohol (EVOH) forming a barrier to gases, a copolymer layer of ethylene and vinyl acetate (EVA) and a layer of ultra low density polyethylene (ULDPE) forming the outer layers.

As explained later, device 50 can be used with bags of capacity different from 50 liters, for instance 10 or 20 liters. Of course, device 50 can be used with bags made from a film different from PureFlex™ film, for instance HyQ® CX5-14 film from Hyclone Industries or Platinum UltraPack film from Lonza.

Bag 1 delimits a closed internal volume, here generally parallelepiped, and comprises at one of its ends several inlet/outlet connectors 3.

Bag 1 also comprises a handle 7 on the opposite side from the connectors 3 and two oblique weld beads 9 situated on respective opposite sides of those connectors 3 at the corners to facilitate the flow of the liquid towards the connectors and avoid a residual volume of that liquid remaining in those corners.

Figure 3:
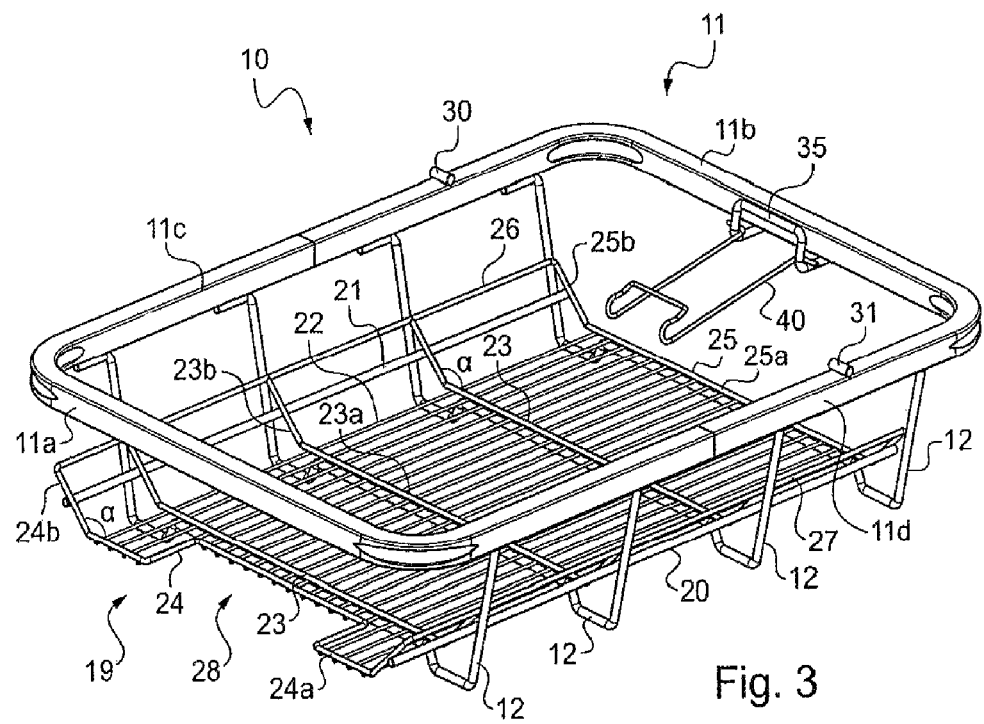
FIG. 3 is a perspective view a basket of the device of FIG. 1.

The basket 10 will now be described with the aid of FIGS. 3 to 5. It comprises a frame 11, a plurality of cross-members 12, a grid 19, two positioning members 30, 31 and two retaining hooks 35 and 40 each provided to cooperate with the handle of a container such as a bag 1.

The frame 11 which has a rectangular outline, comprises a front bar 11a, a rear bar 11b and two lateral bars 11c, 11d, these bars here being formed from one or more metal tubes of square section and of which the ends are welded end to end.

In the drawn embodiment, the positioning members 30, 31 are formed by two metal fingers of which the length is here equal to the width of the lateral bars 11c, 11d of frame 11.

The fingers 30, 31 extend parallel to the front and rear bars 11a, 11b and are each welded to the upper face of a corresponding lateral bar 11c, 11d in the rear part of the basket 10.

As will be seen in detail later, fingers 30, 31 are adapted to each cooperate with a corresponding abutment of the magazine 60, each finger 31 also being adapted to cooperate with a corresponding locking latch 80 disposed on that magazine 60.

The retaining hook 35 which is produced from metal wire formed by bending, is situated in the central part of rear bar 11b of frame 11. It is provided to receive the handle of a large capacity (50 liter) container such as bag 1.

Hook 35 (FIG. 4) comprises a straight section 36 and two right-angle elbow sections 37, 38 which are similar and prepared from a single length of wire.

Each right-angle elbow section 37, 38 is oriented along a plane perpendicular to section 36 and joins to an end thereof by a branch 37a, 38a.

The branches 37b, 38b of sections 37, 38 are fixed by welding to the lower face of the rear bar 11b of frame 11 such that branches 37a, 38a project transversely to the plane of frame 11 on the opposite side from grid 19.

The retaining hook 40 which is also produced from metal wire formed by bending, is hinged to the hook 35. It is provided to receive the handle of a container of smaller capacity than bag 1 (here 10 liters).

Hook 40 comprises a straight section 41 and two portions 42, 43 which have a similar arrangement, the shape of one being the mirror image of the shape of the other.

Each portion 42, 43 comprises an elongate section 44 of J-shaped profile of which one of the ends connects to a straight pivot section 45.

The elongate section 44 is flat and comprises a rounded base 46 of which the ends are connected to a corresponding straight branch 47, 48.

Figure 4:
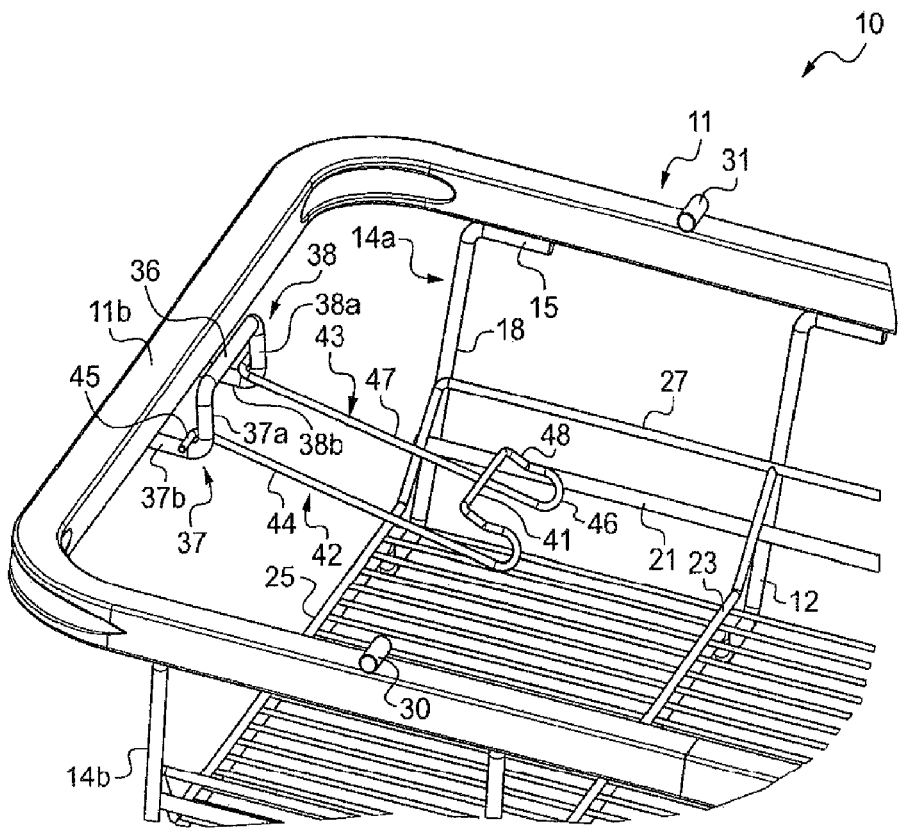
FIG. 4 is a perspective view from another angle of the rear part of the basket of FIG. 3.

As illustrated in FIG. 4, branch 47 is longer than branch 48, the two branches being generally parallel to each other.

Pivot section 45 is connected to branch 47 at the opposite end thereof to base 46 and extends transversely to the plane formed by the elongate section 44 of J-shaped profile.

The two portions 42, 43 are here prepared from the same length of metal wire and are joined by the straight section 41. More particularly, the opposite end of each branch 48 to the corresponding base 46 is connected to section 41 such that the latter extends perpendicularly to the planes of the sections 44 of J-shaped profile; the pivot sections 45 extending parallel to section 41 towards the outside of hook 40.

Hook 40 which has a slightly smaller width than that of hook 35, is movably mounted on that hook 35, the pivot sections 45 resting on the branches 37b, 38b of the right-angle elbow sections 37, 38 such that hook 40 is free to swing.

The cross-members 12 (FIG. 5), which here number four, are formed from metal wires shaped by bending. They each comprise a straight main section 13 provided to receive grid 19, two lateral supports 14a, 14b of J-shaped profile and two straight sections 15 for fixing to frame 11 (FIG. 4).

Each support 14a, 14b of J-shaped profile is planar and comprises a straight base 17 of which the ends are connected to a corresponding straight branch 16, 18.

Figure 5:
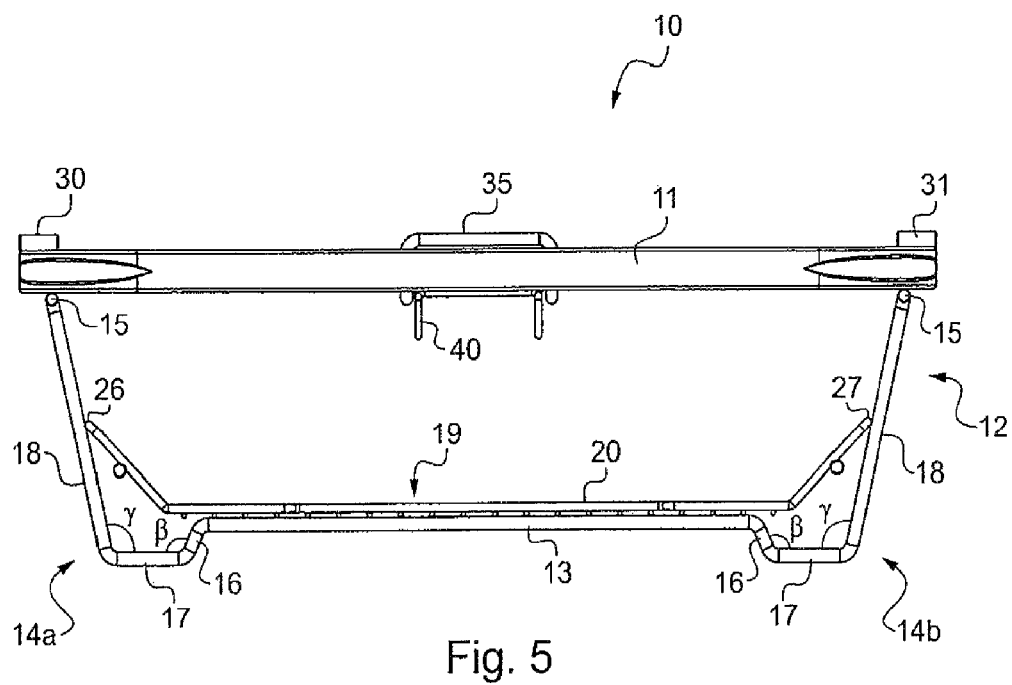
FIG. 5 is a view from the front of the basket of FIGS. 3 and 4.

As illustrated in FIG. 5, branch 16 is approximately two times shorter than the base 17 and forms an angle $\beta$ therewith, here approximately 120°.

Branch 18 is approximately three times longer than the base 17 and forms an angle $\gamma$ therewith, here approximately 100°

The two lateral supports 14a, 14b have a similar arrangement, the shape of one being the mirror image of the shape of the other.

These two lateral supports 14a, 14b are here made from the same length of metal wire and are joined by the main straight section 13. More particularly, the opposite end of each branch 16 to the corresponding base 17 is connected to the main section 13 such that the supports 14a, 14b and section 13 extend in the same plane; section 13 furthermore having the same orientation as bases 17.

The two straight fixing sections 15 are similar and have approximately the same length as that of bases 17 of supports 14a, 14b. They are connected to the opposite end of each branch 18 to the corresponding base 17 and extend facing each other transversely to the plane formed by the supports 14a, 14b and section 13.

Grid 19 comprises a metal framework 20 and a plurality of longitudinal metal bars 21, 22 and transverse metal bars 23.

The metal framework 20 comprises a front bar 24, a rear bar 25 and two straight lateral bars 26, 27, these bars 24, 25, 26 and 27 here being formed from one or more metal wires shaped by bending and of which the ends are welded end to end.

The front 24 and rear 25 bars each comprise a main section 24a, 25a of which the ends respectively connect to two other straight sections, 24b, 25b at the same angle $\alpha$ (FIG. 3), here approximately 120°.

These bars 24 and 25 only differ by their main section, the one 25a of the rear bar being straight whereas the one 24a of the front bar 24 has a rectangular re-entrant portion 28 at its central part. This re-entrant portion 28 is provided to accommodate the connectors of a bag such that the end pieces of those connectors are in the plane of grid 19 and so enable all the liquid contained in the bag to be drained.

The transverse bars 23 are similar to rear bar 25 and thus comprise a straight main section 23a of which the ends respectively connect to two other straight sections 23b with the same angle $\alpha$. Bars 23 are disposed parallel to bar 25, their ends being connected by welding to the side bars 26, 27 of framework 20.

The longitudinal bars 21 are similar to the lateral bars 26, 27, differing therefrom simply by a greater cross-section. The two bars 21 which extend symmetrically on each side of the main sections 23a and 25a, are welded from underneath, to sections 23b, 24b and 25b of the transverse bars 23, front bar 24 and rear bar 25.

The longitudinal bars 22 are similar to the lateral bars 26, 27, differing therefrom simply by a smaller cross-section. Bars 22 are regularly spaced along the main sections 23a, 24b and 25a of the transverse bars 23, front bar 24 and rear bar 25 to which they are welded from underneath.

On assembly of a basket 10, the cross-members 12 are fixed to the frame 11 by welding of the fixing sections 15 onto the lower face of the lateral bars 11c, 11d (in order to avoid any risk of piercing of a bag 1 disposed in a basket 10 by a free end of one of those sections 15). As illustrated in FIG. 3, the four cross-members 12 are mounted parallel to each other and regularly spaced along the lateral bars 11c, 11d.

The grid 19 is positioned on the cross-members 12 (FIG. 5) such that its longitudinal bars 22 and lateral bars 26, 27 respectively rest on the main sections 13 and on the branches 18 of the supports 14a, 14b of J-shaped profile, and such that the three transverse bars 23 and the rear bar 25 are situated facing the main sections 13.

Fixing between grid 19 and cross-members 12 is achieved here by welding points between the transverse 23 and rear 25 bars, and the main sections 13 of those cross-members 12.

Figure 6:
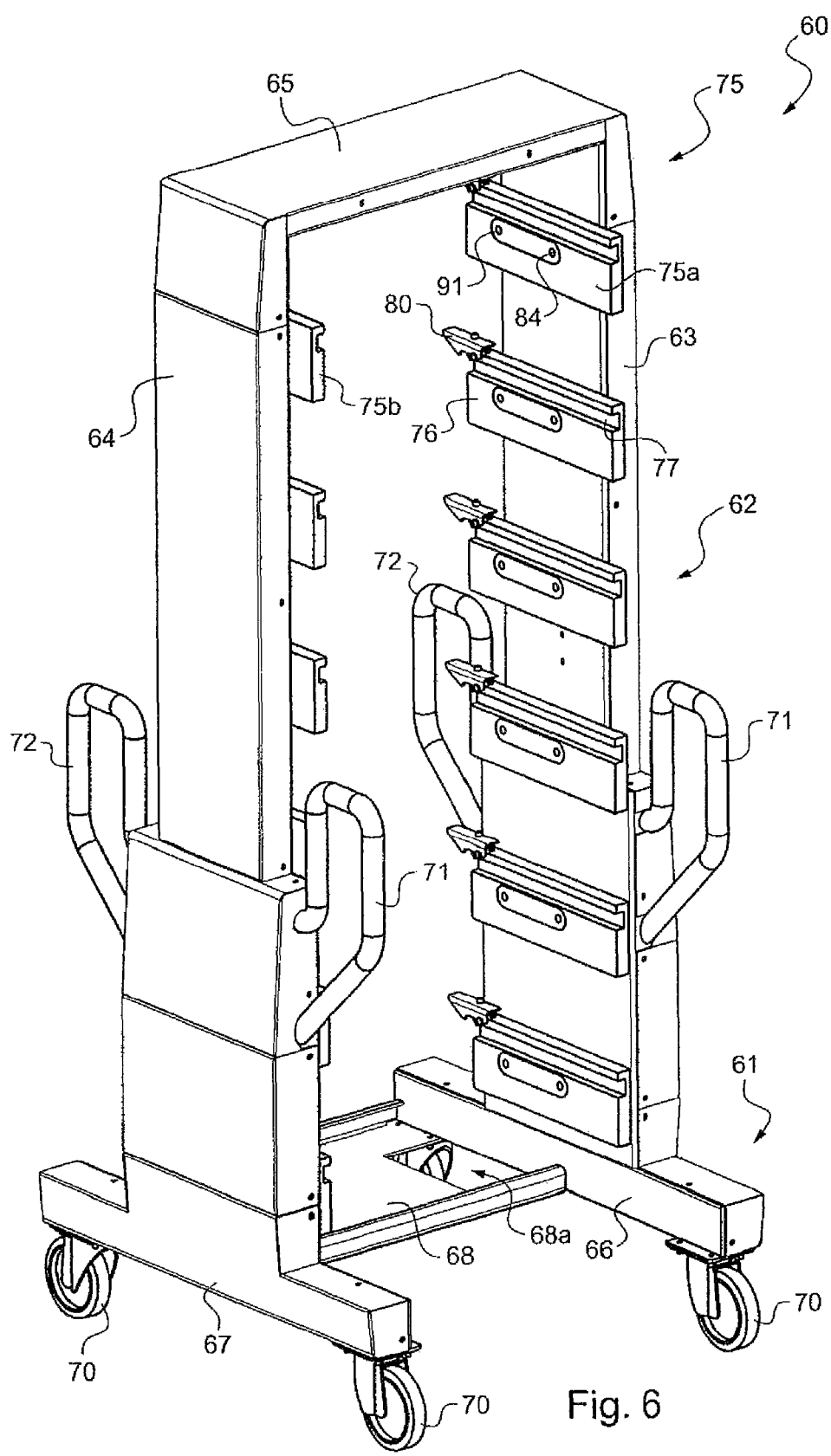
FIG. 6 is a perspective view of the magazine of the device of FIG. 1 the support means of which are in the loading/unloading position.
Figure 7:
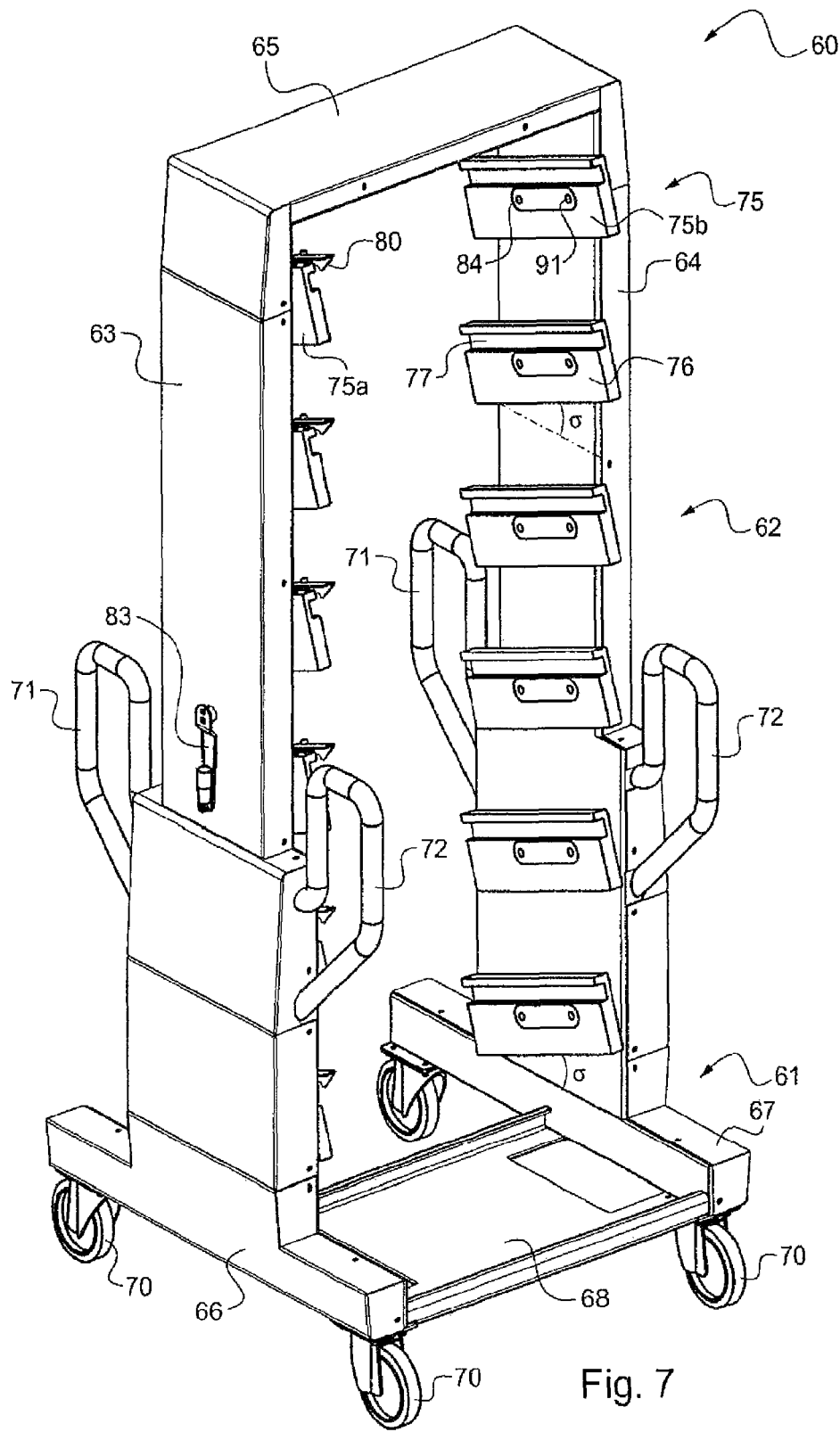
FIG. 7 is a perspective view from another viewing angle of the magazine of FIG. 6 the support means of which are in the operating position.

The magazine 60 will now be described with the aid of FIGS. 6 and 7.

It comprises a horizontal chassis 61 above which is mounted a gantry 62 formed by two hollow lateral uprights 63, 64 which extend facing each other and which are met by a horizontal roof wall 65.

Chassis 61 comprises two tubular metal cross members 66, 67 opposite each other, and a rectangular platform 68 of sheet metal welded between those two cross members 66, 67.

Platform 68 only links the rear parts of cross members 66, 67, such that the front half of chassis 61 is hollow. It also has two cut-outs 68a at its ends in order to drain the liquid which could deposit on that platform in case for example of leakage of a bag 1.

In order to facilitate the movement of magazine 60 within the installation area, chassis 61 is mounted on wheels 70 while two arcuate handles 71, 72 are fixed to the longitudinal edges of each of the uprights 63, 64.

Magazine 60 also comprises a plurality of pairs of opposite runners 75a, 75b that are regularly spaced along the lateral uprights 63, 64, each of those pairs 75 being provided for the insertion and withdrawal by horizontal sliding of a basket 10. In the drawn embodiment, six pairs of runners 75a, 75b are used.

Each runner 75a is formed from a panel 76 of which one of the faces has, along its entire length and close to one longitudinal edge, a groove 77 of which the width is very slightly greater than the thickness of the lateral bars 11c, 11d of the basket 10. In the drawn embodiment, the panel 76 is rectangular.

Each runner 75a also comprises, at its rear end, a locking latch 80 adapted to cooperate with the finger 31 of a basket 10 and which will be described in more detail below.

The runners 75b are similar to runners 75a, differing therefrom only by the absence of a locking latch 80.

Runners 75a (and respectively 75b) are pivotally mounted on the upright 63 (and respectively 64), their opposite face to groove 77 being turned towards the inner face of that upright 63 (and respectively 64).

The magazine 60 further comprises drive means (which will be described in detail below) which may be actuated by a crank 83 (FIG. 7) projecting from the outer face of lateral upright 63, which enables all the pairs 75 of runners 75a, 75b to be pivoted simultaneously to pass them:

from an loading/unloading position (FIG. 6) in which each pair 75 of runners 75a, 75b is horizontal to enable the insertion and the withdrawal of a basket 10 by horizontal sliding;

to an operating position in which each pair 75 of runners 75a, 75b is inclined to the horizontal at an angle $\alpha$ (FIG. 7), here equal to 20°.

For an observer positioned facing the upright 63 that has crank 83, this pivoting of the pairs of runners 75 is carried out anti-clockwise, such that the rear of the runners 75a, 75b is raised relative to their front part.

The loading of the bags 1 filled with liquid is carried out in the following manner.

First of all, and for each of the bags 1 to connect to the circuit, the operator takes a basket 10 which he places close to that bag 1 such that the front face of the basket 10 faces the end of the bag 1 where the handle 7 is situated (the opposite end to the connectors 3).

Figure 8:
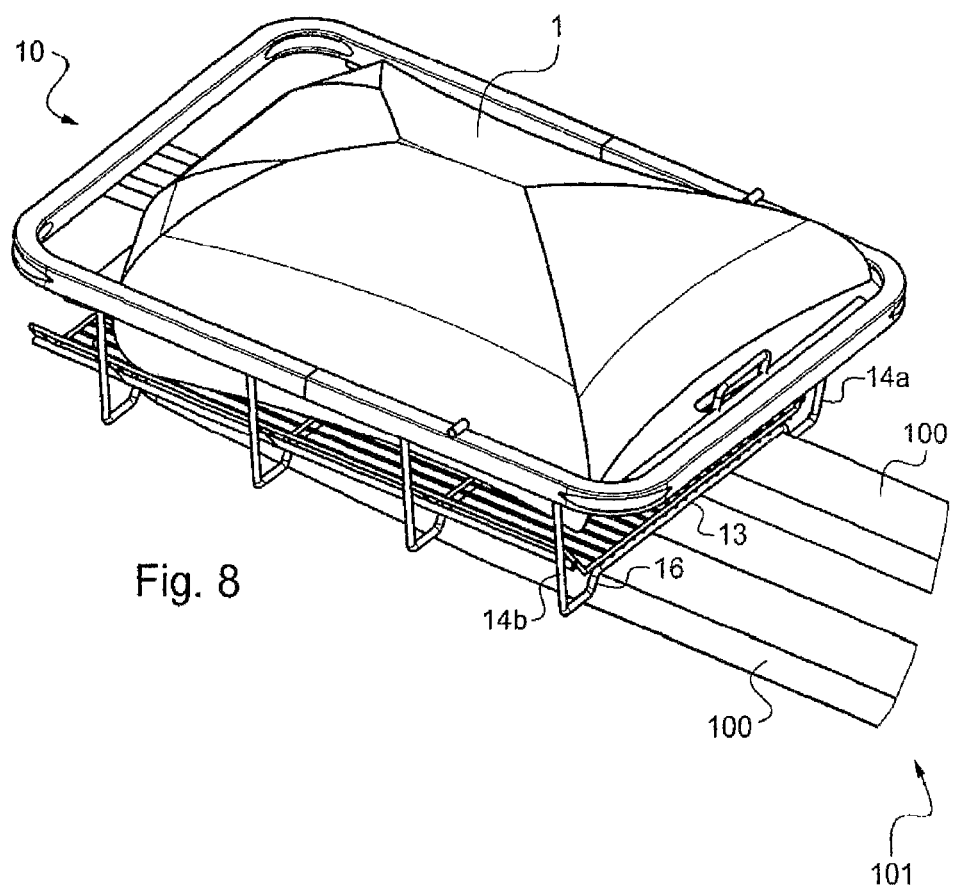
FIG. 8 is a perspective view of a basket, containing a flexible container, resting on the arms of the fork of a lifting truck.

He then proceeds with the loading of the bag 1 into the basket 10 by sliding it over the grid 19 using the handle 7 until the inlet/outlet connectors 3 are situated above the rectangular re-entrant portion 28 of that grid 19. He then releases the handle 7, then introduces the free end of the retaining hook 35 into that same handle (FIG. 8) in order to avoid the bag 1 sliding when the basket 10 is in inclined position.

The loading of a bag of smaller capacity (10 liters) is carried out in similar manner, the only difference consisting in inserting the free end of hook 40 (and not that of hook 35) into the handle of that bag.

For each basket 10 in which a bag has been placed, the operator either uses his arms or brings a lifting truck close to the basket 10. In that case, he carries out the following operations:

positioning the arms 100 of the fork 101 of that lifting truck to face the rear side of basket 10;

inserting the arms 100 under basket 10 while making them progressively slide over four straight sections 13 of the cross members 12 (FIG. 8), the outer edges of the arms 100 then being disposed against branch 16 of the two supports 14a, 14b of J-shaped profile such that basket 10 is fixed in its transverse direction;

raising basket 10 using the arms 100 to place it facing a corresponding pair 75 of horizontally oriented runners 75a, 75b;

still with the help of arms 100, slidingly inserting the lateral bars 11c, 11d of the frame 11 of basket 10 into the grooves 77 of the pair 75 of runners 75a, 75b until the fingers 30, 31 come into abutment against the rear end of the runners 75a, 75b, the locking latch 80 then cooperating with the finger 31 in order to lock basket 10 on the pair 75; and withdrawing arms 100 from basket 10.

Figure 9:
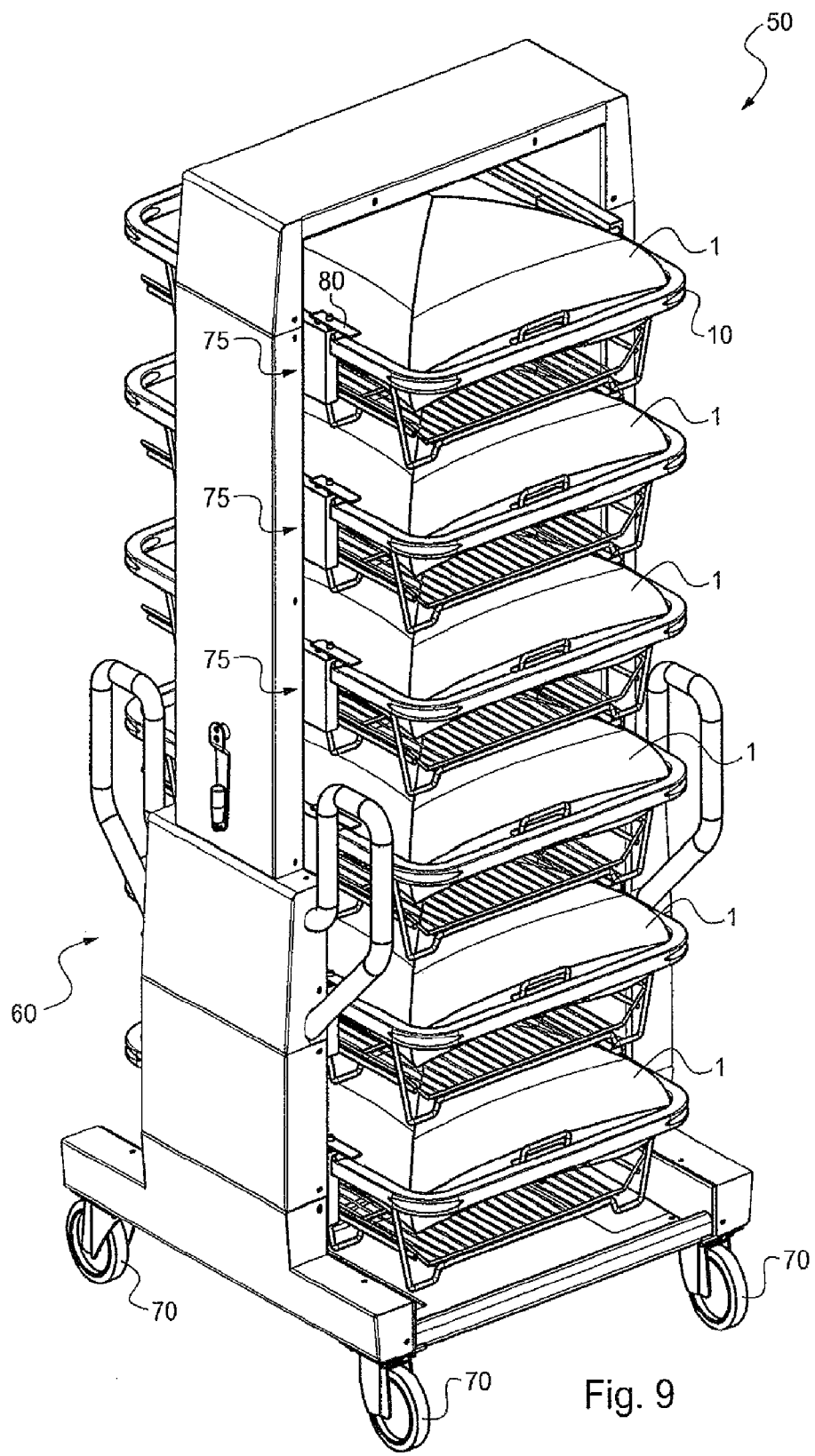
FIG. 9 is a perspective view of the device of FIG. 1 of which the support means occupy their loading/unloading position, the baskets being loaded into the magazine.
Figure 10:
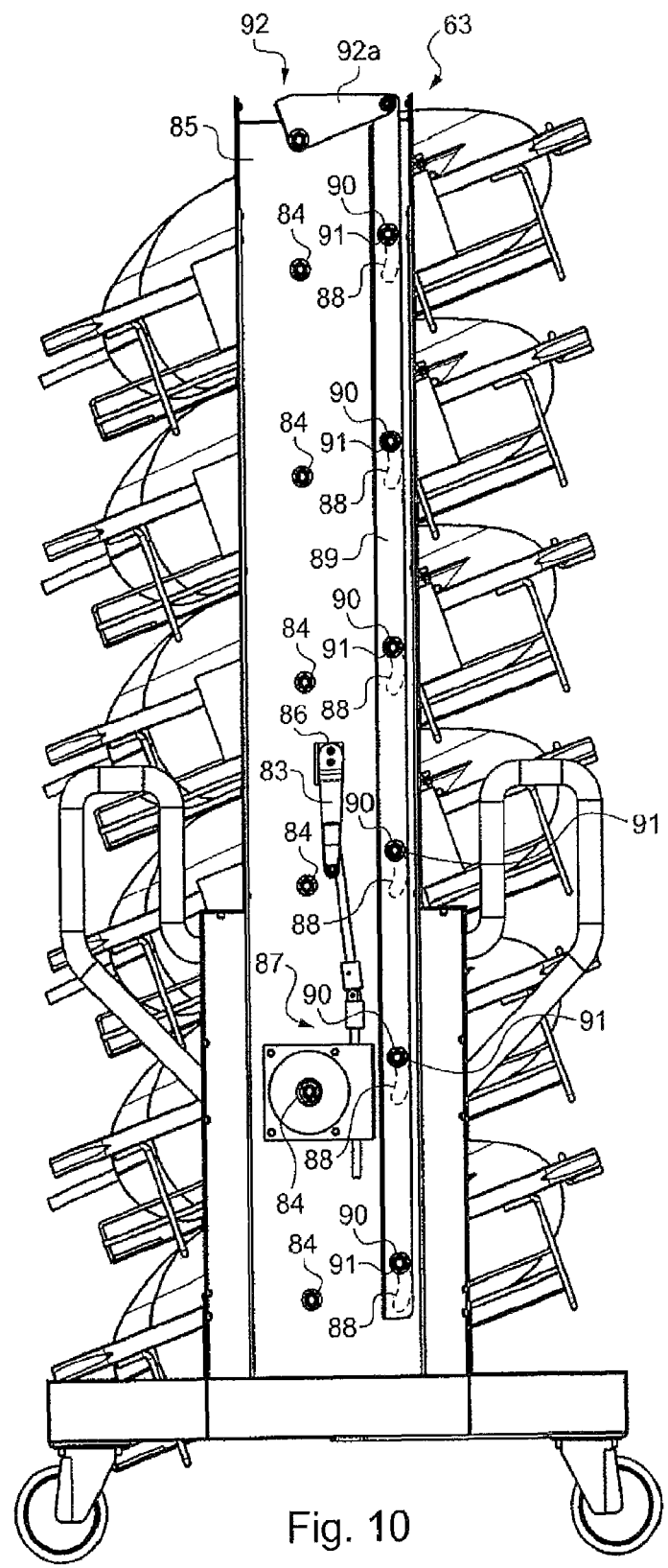
FIG. 10 is a side view of the device of FIG. 1 of which the outer faces of the magazine have been removed in order to show the drive means of the support means.

After loading all six baskets 10 (or only those in which a bag has been placed) into the magazine 60 (FIG. 9), the operator turns the crank 83 in order to simultaneously pivot all the pairs 75 of runners 75a, 75b so as to incline the baskets 10 at an angle $\sigma$ (here 20°) relative to the horizontal (FIGS. 1 and 10).

Where the magazine has to be moved between the place of loading and the place of installation, it is convenient to carry out that movement with the runners in loading/unloading position (horizontal).

In that inclined position, magazine 60 then occupies its operating configuration in which the baskets 10 are disposed inclined one above the other with the inlet/outlet connectors 3 of the bags 1 in the lower part and pointing towards the floor, such that air bubbles rise in the direction of the handles 7.

After connecting the bags 1 to an installation for treating biological liquid, the draining of the biological liquid they contain may thus be carried out without risk of introducing air into the pipes of that installation, or at least with a very limited risk.

Once the drainage has terminated, the operator proceeds with the unloading of the bags 1.

He starts by turning the handle 83 in the opposite direction in order to bring all the pairs 75 of runners 75a, 75b (and thus the baskets 10) into loading/unloading position (FIG. 9).

Next, he unlocks the baskets 10 from the pairs 75 by acting on the latches 80 and withdraws them from the magazine 60 manually (the use of a lift is no longer necessary, as the bags 1 are empty).

Lastly, after having removed the handles 7 from the retaining hooks 35 beforehand, the operator removes the empty bags 1 from baskets 10 and consigns them to waste.

In what follows, certain aspects of the shape of magazine 60 will be reviewed of which the advantages will be better understood in the light of the description which has just been made of the loading method according to the invention.

The vertical spacing between two pairs 75 of runners 75a, 75b of magazine 60 depends on the volume of the container of greatest capacity that can be inserted into a basket 10, in this case a container of 50 liters such as bag 1.

More particularly, this spacing is predetermined in order that in operating configuration of the magazine 60, a bag such as 1 filled with liquid and contained in a basket 10 is flush with the grid 19 of the basket 10 situated just above it (FIG. 10), so as to minimize the height to the ground of magazine 60.

The angle of inclination $\sigma$ of the pairs 75 of runners 75a, 75b is also optimized. More particularly, it is clear that the greater the angle $\sigma$, the less is the risk of transferring air bubbles into the circuit but in exchange, the height from the ground of the magazine 60 is increased.

In the preferred embodiment illustrated in the drawings, the value of that angle $\sigma$ is of the order of 20°. This inclination makes it possible to a great extent to limit the risk of introducing air without however increasing the height above the ground of the magazine 60 too much, such that it can pass beneath a standard door frame (2 meters) in order to enable its displacement from one room to another and to facilitate the unlocking then the manual withdrawal of the baskets 10 after draining the bags 1.

The fact that the front half of the chassis 61 of that magazine 60 is hollow also participates in the optimization of its height above the ground by making it possible to position the first pair 75 of runners 75a, 75b close to chassis 61. Thus, on pivoting the pairs 75, the front of the basket 10 supported by the first pair 75 enters the hollow of the chassis 61 to locate as close as possible to the ground (FIG. 10).

With the aid of that FIG. 10, a description will now be given in more detail of the means for driving the pairs 75 of runners 75a, 75b between the loading/unloading position and the operating position.

The six runners 75a are rigidly linked to one end of a first corresponding metal rod 84 about which they are adapted to pivot. Each of these rods 84 passes through a circular opening provided in the inner wall 85 of the lateral upright 63 and comprises at its opposite end to the runner 75a a screw thread cooperating with a nut to prevent its withdrawal after assembly.

At the height of each rod 84 and behind it, the inner wall 85 of the lateral upright 63 comprises an oblong opening 88 of circle arc form shown in dashed line in FIG. 10.

A flat vertical bar 89 having approximately the same length as the upright 63 but much narrower, is disposed along the inner wall 85 of that upright 63. This vertical bar 89 comprises six circular openings 90 distributed over its height so as to have the same spacing as between the rods 84 and of which the diameter matches the width of the oblong openings 88.

Behind the rods 84, the six runners 75a are also rigidly linked to one end of a second corresponding metal rod 91. Each of these rods 91 passes, from runner 75a, through an oblong opening 88 then a circular opening 90 of the flat vertical bar 89 and comprises at its opposite end to the runner 75a a screw thread cooperating with a nut to prevent its withdrawal after assembly.

Each runner 75a is thus fastened to a first rod 84 about which it may pivot, and to a second rod 91 which travels in an oblong opening 88 of the inner wall 85 of upright 63, the form of that oblong opening 88 determining the maximum inclination a, here equal to 20°, which runner 75a can assume relative to the horizontal.

As for vertical bar 89, this makes it possible to mechanically link all six runners 75a such that they all simultaneously pivot through the same angle of inclination.

The mechanical linking means enabling simultaneous pivoting of the runners 75b to be obtained relative to the lateral upright 64 are identical to those described above for the lateral upright 63 and the six runners 75a.

The flat vertical bar 89 of the upright 63 and its equivalent of the upright 64 are hingingly linked at their top by a bridging member 92 comprising two brackets 92a hingingly mounted respectively to the tops of the uprights 63 and 64.

Thus, the six pairs 75 of runners 75a and 75b are mechanically linked and all pivot simultaneously through the same angle of inclination.

Crank 83 which enables this pivoting to be performed, is fixed to a first end of a shaft 86 freely mounted to rotate on the inner wall 85 of the lateral upright 63. This input shaft 86 is linked via an angle transmission and a reduction transmission 87 (here comprising a set of cog wheels and an endless screw) to one of the rods 84 (here the second going up from the ground) which is thus slightly longer than the other rods 84 in order to pass through the reduction transmission 87.

The reduction ratio is such that when the operator turns the handle 83 through seven revolutions, the pairs 75 of runners 75a, 75b pivot by approximately 20°.

With the aid of FIG. 11, a description will now be given in more detail of a locking latch 80 adapted to cooperate with the finger 31 of a basket 10.

This locking latch 80 comprises a roof wall 93 having a rectangular outline and a lateral wall 94 extending perpendicularly to wall 93 along one of its longitudinal edges.

The first end 95 of lateral wall 94 is pivotally mounted about a rotational shaft 96 on the inner face of a runner 75a in the vicinity of its upper rear corner.

The second end 97 of lateral wall 94 has a profile inclined from top to bottom and from the rear to the front.

Between its two ends 95 and 97, the lateral wall 94 comprises, on the opposite side from the roof wall 93, a cut-out 98 partially conforming to the cross-section of finger 31.

Figure 11:
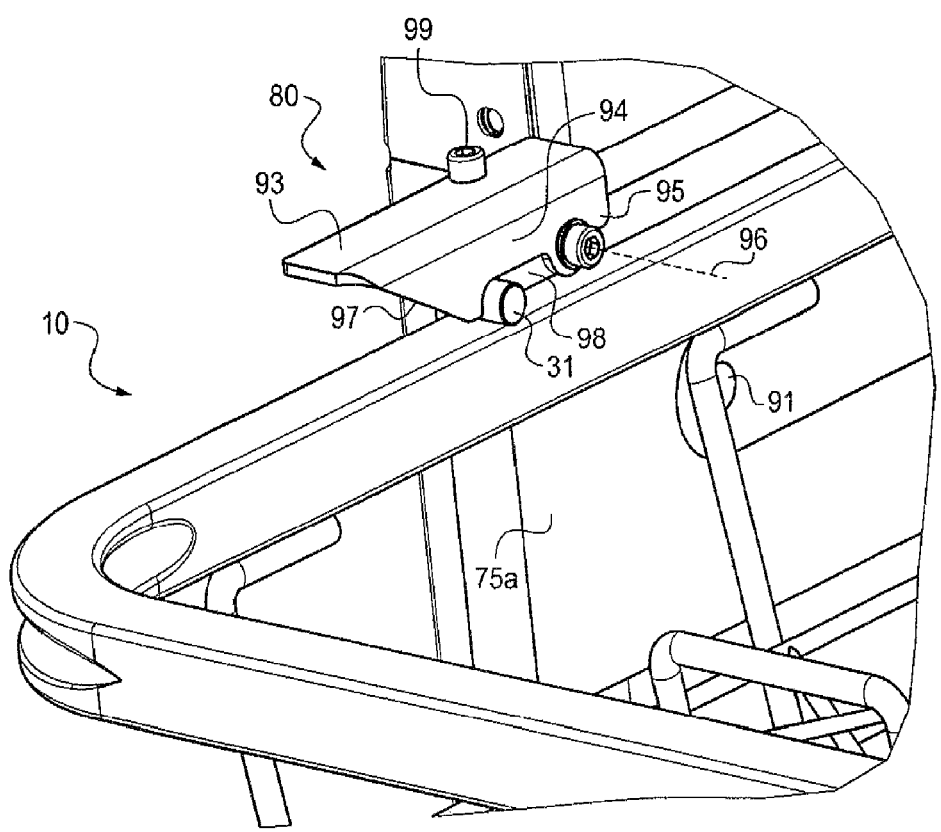
FIG. 11 is an enlarged perspective view of a portion of the rear part of the basket of FIG. 3 loaded into the magazine of the device according to the invention.

The latch 80 also comprises a prop 99 which extends through roof wall 93 and perpendicularly thereto, in the direction of the cut-out 98 (of which only the head can be seen in FIG. 11).

A compression spring (not visible in FIG. 11) is furthermore fixed between the roof wall 93 and the longitudinal edge of runner 75a in order to permanently bias the latch 80 towards the runner 75a until the free end of prop 99 rests on the longitudinal edge of the runner 75a (the roof wall 93 then being parallel to that longitudinal edge as in FIG. 11).

The operation of this locking latch 80 will now be described. As a basket 10 is inserted into a pair 75 of runners 75a, 75b, the finger 31 approaches the latch 80 until it enters into contact with its edge 97 having an inclined profile.

The force exerted by the finger 31 towards the front of magazine 60 on that inclined profile makes the end 97 pivot upwardly about shaft 96, such that the finger 31 can continue its movement until in comes into abutment against the rear end of runner 75a.

As soon as finger 31 has gone past the inclined profile, the latch 80 is returned downwardly by the spring, cut-out 98 then coming to lock that finger 31 and thereby basket 10.

In variants, not shown, of the device according to the invention:
- the support means comprise a single inclinable plate provided with fastening straps, the baskets being stacked on top of each other on the plate in horizontal position, strapped to each other on that plate which is then inclined;
- the baskets are formed of solid metal or plastic or another material; and/ or are shaped differently, for instance as a bin;
- the magazine comprises at least one reader of electronic labels that are intended to be bonded to the containers and bearing information as to the nature of those containers (volume, nature of the liquid, etc.), the readers, using a technology that is both wireless and contact free (for example RFID: radio frequency identification), conveying the information collected and possibly other information (for example the angle of inclination of the containers relative to the horizontal and their position in the magazine), after reading, to a display present on the magazine and/or towards an automatic controller/computer external to the magazine;
- the locking of the baskets to the magazine is obtained by positioning members different from fingers 31, for instance pins each disposed on a runner and comprising a metal rod at one of its ends, each pin being adapted to cooperate with a detent disposed on the frame of a basket;
- in each runner, the region of the groove in contact with the baskets is an interchangeable part subject to wears, manufactured for example from a plastics material of acetal type;
- the source of rotation is other than a crank, for example an electric motor;
- the angle of inclination of the runners is different from 20°; for example between 10 and 45°;
- the number of pairs of runners and of baskets is different, for example from two to ten;
- each basket comprises a cover to protect its flexible bag;
- each basket comprises a movable double retaining hook of marine anchor profile (or two separate moveable hooks)

hinged to the fixed hook to cooperate with the handles of bags of different capacities (for example 10 and 20 liters); and/or the pivot sections of the moveable retaining hook are curved round the branches of the fixed hook on which they rest.

Numerous other variants are possible according to circumstances, and in this connection it is to be noted that that the invention is not limited to the example embodiments described and shown.

The invention claimed is:

1. A device for supporting a plurality of flexible containers for liquid; comprising:
    a plurality of baskets, each containing at least one of said plurality of flexible containers; each said basket comprising a frame;
    a magazine configured to receive said baskets and allow withdrawal of said baskets, and adopt an operating configuration in which said baskets are disposed inclined one above the other with each said container being in a position in which at least one fluid inlet/outlet connector is in the lower part thereof, said magazine comprising:
    supports for said baskets, able to adopt a loading/unloading position such that each said basket containing a respective flexible container can be loaded into said magazine and unloaded from said magazine along a horizontal path, and able to adopt an operating position to maintain each said basket in an inclined position to make said magazine adopt said operating configuration; each said support comprising, for each said basket, a pair of opposite runners each having a groove configured to slidingly receive said frame of a basket, said runners of each said pair being pivotally mounted on opposite uprights of said magazine, each said pair of opposite runners comprising an abutment to limit the pivoting of said runners, said abutment comprising at least one rod adapted to travel in an oblong opening of one of said uprights, and
    a driver for driving said supports between said loading/unloading position and said operating position.

2. A device according to claim 1, wherein each said pair of runners comprises a lock for locking said basket in said magazine.

3. A device according to claim 2, wherein said lock comprises a latch mechanically linked to one of the runners of said pair, said latch being adapted to cooperate with a positioning member of a said basket.

4. A device according to claim 1, wherein said driver comprises a mechanical linkage rigidly linking said pair of runners together and a pivot member for pivoting said pairs of runners.

5. A device according to claim 4, wherein said mechanical linkage comprises two metal bars disposed in said uprights of which the respective tops are linked by a bridging member.

6. A device according to claim 4, wherein said pivot member comprises a reduction transmission and a source of rotation.

7. A device according to claim 1, wherein said magazine comprises a horizontal chassis mounted on wheels.

8. A device according to claim 7, wherein said horizontal chassis is partly hollow to permit the travel of a said basket on passage from said loading/unloading position to said operating position.

9. A device according to claim 1, wherein each said basket comprises a grid adapted to support one of said plurality of flexible containers.

10. A device according to claim 5, wherein said pivot member comprise a reduction transmission and a source of rotation.

11. A method of supporting a plurality of flexible containers for liquid, comprising:
    providing a magazine for receiving and allowing withdrawal of a plurality of baskets, each basket comprising a frame; said magazine comprising supports, each said support comprising, for each said basket, a pair of opposite runners each having a groove configured to slidingly receive said frame of a basket, said runners of each said pair being pivotally mounted on opposite uprights of said magazine, each said pair of opposite runners comprising an abutment to limit the pivoting of said runners, said abutment comprising at least one rod adapted to travel in an oblong opening of one of said uprights; each basket containing one of said plurality of flexible containers;
    positioning said magazine in a loading configuration;
    sliding each said basket containing a flexible container into the grooves of oppositely positioned runners along a horizontal path;
    positioning said magazine in an operating configuration in which said baskets are disposed inclined one above the other with each said container being in a position in which at least one fluid inlet/outlet connector is in the lower part thereof.

12. The method of claim 11, further comprising positioning said magazine in an unloading configuration to remove said baskets from said magazine along a horizontal path.

13. The method of claim 12, wherein said magazine is positioned in said loading, unloading and operating configurations with a driver.

14. The method of claim 11, wherein said magazine comprises a horizontal chassis mounted on wheels.

* * * * *